Figure 1:
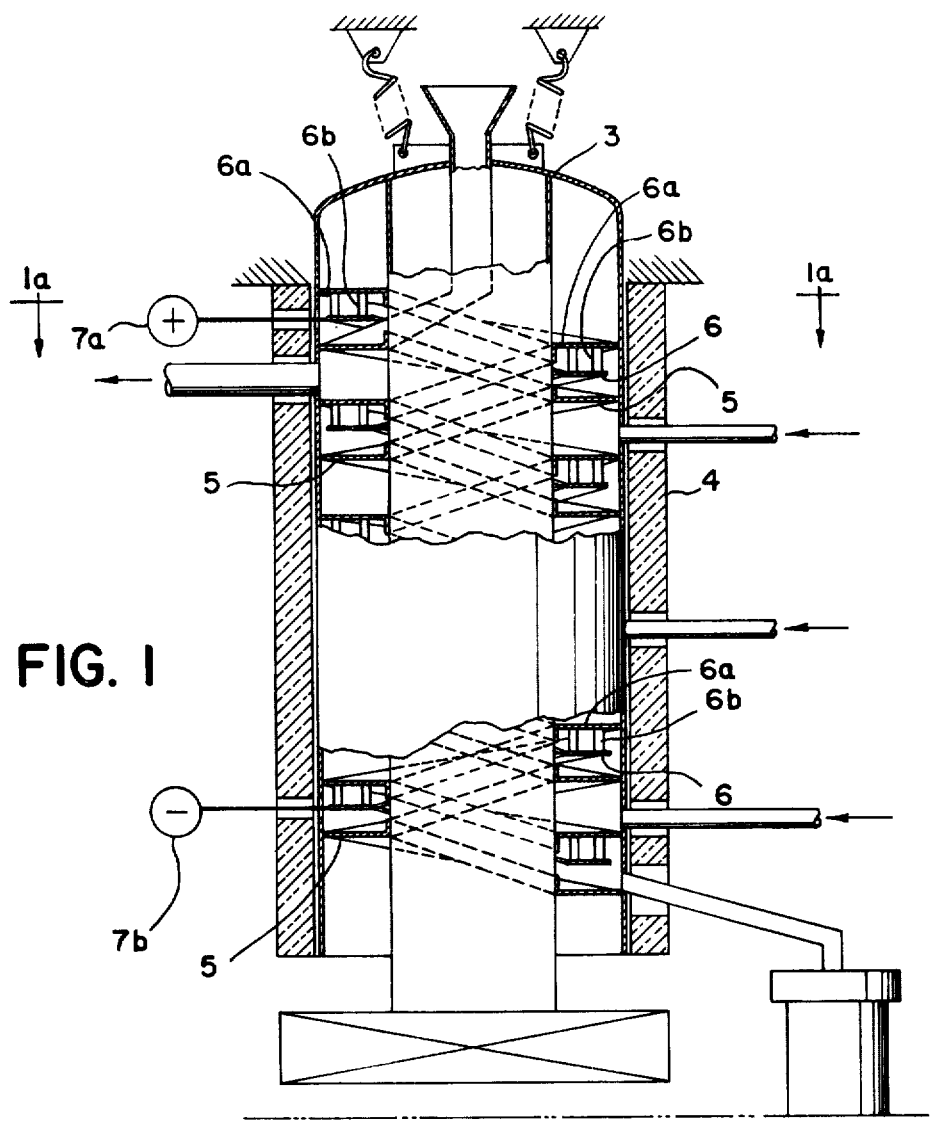

United States Patent [19]

Sauer et al.

[11] 4,048,472
[45] Sept. 13, 1977

[54] VIBRATORY SPIRAL CONVEYOR CHUTE AND A RESISTANCE HEATING ELEMENT

[75] Inventors: Hans Sauer, Idstein-Walsdorf; Thomas Czerny, Fischbach, both of Germany

[73] Assignee: Varta Batterie Aktiengesellschaft, Germany

[21] Appl. No.: 686,992

[22] Filed: May 17, 1976

[30] Foreign Application Priority Data

May 17, 1975  Germany .............................. 2522152

[51] Int. Cl.² ............................................... F27D 11/02
[52] U.S. Cl. .................................... 219/388; 34/147; 34/164; 219/552; 259/2; 338/297; 338/304; 432/134
[58] Field of Search .............. 219/388, 389, 536, 537, 219/552; 338/208, 209, 210, 212, 217, 218, 286, 287, 288, 297, 304; 99/443 R, 443 C; 259/1 R, 2; 34/147, 164; 432/134

[56] References Cited

U.S. PATENT DOCUMENTS

| 693,455 | 2/1902 | Stanley | 34/164 |
|---|---|---|---|
| 2,667,452 | 1/1954 | Petit | 432/134 |
| 2,983,051 | 5/1961 | Zimmermann et al. | 34/164 |
| 3,218,347 | 11/1965 | Laing | 338/286 X |
| 3,461,275 | 8/1969 | Poole | 338/218 X |
| 3,545,609 | 12/1970 | Carrera et al. | 34/164 |
| 3,651,304 | 3/1972 | Fedor | 219/552 X |
| 3,742,614 | 7/1973 | Bettermann et al. | 34/147 |
| 3,847,069 | 11/1974 | Guibert | 99/443 R |
| 3,852,568 | 12/1974 | Clement | 338/208 X |
| 3,868,213 | 2/1975 | Shulika et al. | 432/134 |

FOREIGN PATENT DOCUMENTS 49,737    1/1935   Denmark .............. 338/288

*Primary Examiner*—Volodymyr Y. Mayewsky
*Attorney, Agent, or Firm*—Weiser, Stapler & Spivak

[57] ABSTRACT

Heating for a vibratory spiral conveyor used to react powdery and gaseous substances is accomplished by an expanded metal resistance heater element positioned between adjacent turns of the conveyor.

4 Claims, 3 Drawing Figures

VIBRATORY SPIRAL CONVEYOR CHUTE AND A RESISTANCE HEATING ELEMENT

This invention relates to an apparatus for performing reactions between powdery and gaseous substances. The apparatus comprises a reaction vessel adapted to be supplied with the powdery substance and the reaction gas and which includes a reaction chamber containing a vibratory spiral conveyor with gas-tight enclosure. To this extent the apparatus corresponds to that disclosed in co-pending U.S. patent application Ser. No. 544,753, filed Jan. 28, 1975, and assigned to the assignee of the present invention. The contents of the said co-pending application are made part of the present application by reference, as though fully set forth herein.

As more fully described in said co-pending patent application, in such apparatus powdery substance is supplied to the vibratory spiral chute from the top and is brought into contact with a reaction gas introduced in counterflow relationship. The gaseous reaction products and the excess reaction gas are removed at the top while the powdery reaction products are removed in the lower portion of the vibratory spiral chute. The powdery substance covers the bottom of the spiral chute in the form of a continuous, downwardly moving layer and is intensively mixed within the chute.

This vibratory spiral conveyor further includes a heating arrangement, for example heating rods, which are positioned below the turns of the spiral. Another possibility is the provision of special passages below the chute turns, through which a liquid, for example, may be caused to circulate in order to produce heating. The provision of such heating rods or special passages for a heating liquid is, however, the cause of high costs in fabrication and assembly. Moreover, with such arrangements there is some difficulty in obtaining uniform heating in all portions of the spiral conveyor or alternatively, should this be desired, to achieve precise variations in the form of a predetermined temperature gradient along the spiral conveyor.

Accordingly, it is an object of the present invention to provide a heating arrangement for a vibratory spiral conveyor for use in carrying out reactions between powdery and gaseous substances which is simple to construct and simple to mount in relation to the spiral conveyor.

It is another object to provide such a heating arrangement which is convenient to provide with appropriate connecting contacts for current supply.

It is another object to provide such a heating arrangement which provides good heat radiation with low mass.

These and other objects which will appear are achieved, in accordance with this invention, by utilizing as the heater arrangement a heating conductor which is positioned generally parallel to the turns of the spiral chute and which takes the form of a generally planar expanded metal.

Figure 1A:
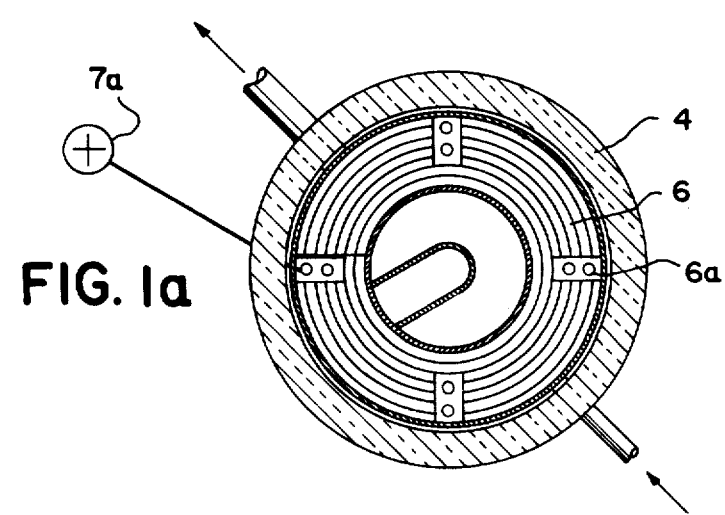
Figure 2:
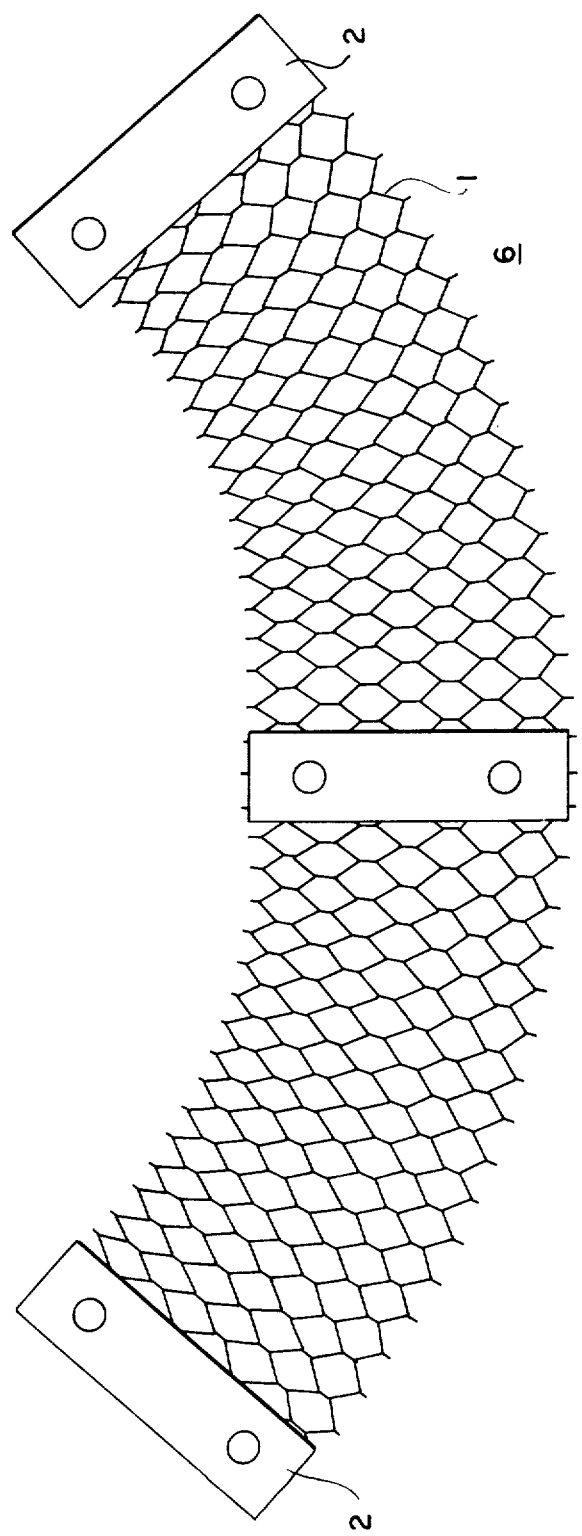

For further details reference is made to the discussion which follows in the light of the accompanying drawings, wherein FIG. 1 shows, partly in cross-section, an elevation view of a diagrammatic illustration of an embodiment of the invention;

FIG. 1a shows a diagrammatic cross-sectional view of a top view of the embodiment of FIG. 1; and FIG. 2 shows a detailed view of a portion of the apparatus of FIGS. 1 and 2.

The same reference numerals are used in the several figures to designate corresponding elements.

Referring to FIGS. 1 and 1a, the vibratory spiral conveyor there diagrammatically illustrated consists primarily of a reaction chamber 3 with enclosure 4. Into this spiral conveyor reactor powdery material may, for example, be introduced from the top. The apparatus is traversed by a reaction gas in counterflow direction, so that the gaseous reaction products and the reaction gas are withdrawn in the upper region while the powdery reaction products are removed in the lower portion of reaction chamber 3. The powdery material is placed within the reaction chamber upon a vibrating spiral chute 5, the vibration being produced, for example, by an oscillating magnet or an eccentric motor drive. The powdery material then flows in a substantially continuous layer along the spiral path and may also be additionally intermixed by special mixing devices such as more fully disclosed in the above-mentioned co-pending application. Above the spiral path there are positioned the resistance heaters embodying the invention and made of expanded metal 6. They may be attached, for example, to straps 6a mechanically connected either to spiral chute 5 or to the reaction chamber 3 via standoff insulators 6b. Preferably, they are positioned approximately midway between adjacent turns of the chute. Electrical connections from outside the reactor are provided at 7a and 7b.

In FIG. 2, to which reference may now be had, these expanded metal heating conductors 6 are shown to a larger scale. They are readily producible in the curved shape illustrated. Moreover, these heating means are convenient to mount and, since they possess only low mass, they do not appreciably increase the vibratory energy required by the apparatus. This, in itself, provides a substantial technical advantage over the commonly used liquid-tight passages for introduction of a heating medium. Moreover, the heating arrangement according to the invention requires little space. The expanded metal heating conductors themselves can, if necessary, be clad with plastic. Alternatively, they can be made themselves of a corrosion resistant material. For example, fine steel or stainless steel is suitable for that purpose.

The curvilinear configuration of the individual sections of the expanded metal heating conductor can readily be achieved during manufacture of the expanded metal. Moreover it is possible to concentrate the heat production in predetermined regions, by providing more or less wide expansion during production of the expanded conductor. Electrical connections to this generally planar heating conductor can be provided by refraining from punching and expanding at least the beginning and ending segments 2 of strip 1 during production of the expanded metal. This prevents the formation of additional contact resistance such as arises when contact lugs are welded or soldered on.

We claim:

1. In a system for producing reactions between powdery and gaseous substances, which system comprises a substantially flat-bottomed vibratory spiral conveyor chute postioned within a reaction vessel into which the said substances are introduced, the combination with said conveyor chute of a substantially planar expanded metal resistance heating element, insulating means for mounting the resistance heating element above and generally paralleling the flat bottom of the spiral conveyor chute, electrical connecting means for supplying the resistance element with electrical energy, portions adjacent the expanded metal body which are of unexpanded metal, and said connecting means comprising electrical connections from the outside of the reaction vessel to said unexpanded portions.

2. The system of claim 1, wherein the unexpanded metal portions are positioned at opposite ends of the expanded metal body.

3. The system of claim 1, wherein different portions of the body are expanded to different degrees.

4. The system of claim 1, wherein the mounting means positon the expanded metal body approximately midway between adjacent turns of the spiral conveyor chute.

* * * * *